(12) United States Patent
Linnel

(10) Patent No.: US 10,000,143 B1
(45) Date of Patent: Jun. 19, 2018

(54) DEBRIS CATCHING SYSTEM FOR A CHILD SEAT

(71) Applicant: Christopher Linnel, Credtview, FL (US)

(72) Inventor: Christopher Linnel, Credtview, FL (US)

(*) Notice: Subject to any disclaimer, the term of this patent is extended or adjusted under 35 U.S.C. 154(b) by 200 days.

(21) Appl. No.: 14/932,920

(22) Filed: Nov. 4, 2015

(51) Int. Cl.
*B60N 3/08* (2006.01)
*B60N 2/28* (2006.01)

(52) U.S. Cl.
CPC ............. *B60N 3/08* (2013.01); *B60N 2/2821* (2013.01); *B60N 2/2839* (2013.01)

(58) Field of Classification Search
None
See application file for complete search history.

(56) References Cited

U.S. PATENT DOCUMENTS

| | | | |
|---|---|---|---|
| 837,570 A | 12/1906 | Jackson | |
| 924,554 A | 6/1909 | Jackson | |
| 939,841 A | 11/1909 | Jackson | |
| 1,050,205 A | 1/1913 | Conley | |
| 2,571,574 A | 10/1951 | Hicks | |
| 2,585,434 A | 2/1952 | Caponera | |
| 2,700,413 A | 1/1955 | Williams | |
| 2,827,953 A | 3/1958 | Jones | |
| 2,836,229 A | 5/1958 | Spetner | |
| 2,938,574 A * | 5/1960 | Brown | A47D 15/00 297/182 |
| 3,298,736 A * | 1/1967 | Decker | A47D 15/00 297/182 |
| 3,367,714 A | 2/1968 | Stone | |
| 4,094,547 A | 6/1978 | Zampino et al. | |
| 4,136,907 A | 1/1979 | Hermanns | |
| 4,165,123 A | 8/1979 | Hutson | |
| 4,252,372 A | 2/1981 | Harder, Jr. | |
| 4,848,834 A | 7/1989 | Linski | |
| 4,948,195 A | 8/1990 | Saunders | |
| 5,547,249 A | 8/1996 | Riley et al. | |
| 5,549,353 A | 8/1996 | Gaudet et al. | |
| 5,660,432 A | 8/1997 | Davis | |
| 5,887,941 A | 3/1999 | Kopinski et al. | |
| 6,022,072 A | 2/2000 | Moyer | |
| 6,079,773 A * | 6/2000 | Hassan | B60N 2/44 297/112 |
| 6,276,752 B1 * | 8/2001 | Conte | B60N 2/2821 297/182 |
| 6,394,542 B2 | 5/2002 | Potisch et al. | |
| 6,460,925 B1 | 10/2002 | Kovacs | |
| 6,652,947 B2 | 11/2003 | Sweeney et al. | |

(Continued)

*Primary Examiner* — Sarah Burnham McPartlin
(74) *Attorney, Agent, or Firm* — Peter Loffler

(57) ABSTRACT

A debris catching system for positioning against a typical child seat used in vehicles uses a pair of panel members, each disposed against one of the sides of the child seat and cinched to the base of the child seat via a pair of strap systems with a third strap system stabilizing the panels against a medial section of a back member of the child seat. Each panel has one or more pockets to catch and hold debris therein with the panels and their pockets being made from a moisture impervious material. An optional panel can be attached to each of the above panels and slide with respect to such panels so as to be raisable to help block sun and other unwanted light from shining onto the occupant of the child seat.

17 Claims, 5 Drawing Sheets

(56) References Cited

U.S. PATENT DOCUMENTS

| | | | |
|---|---|---|---|
| 6,742,837 B1 * | 6/2004 | Alexander | B60R 7/043 297/188.04 |
| 6,796,606 B2 | 9/2004 | Marshall | |
| 7,261,375 B2 * | 8/2007 | Godshaw | A01K 1/0272 119/28.5 |
| 7,311,356 B2 * | 12/2007 | Pudney | B60R 7/043 297/188.01 |
| 7,527,314 B2 | 5/2009 | Dohan | |
| 7,717,504 B2 | 5/2010 | Centracco et al. | |
| 7,758,090 B2 | 7/2010 | Gregory | |
| 7,891,731 B2 | 2/2011 | O'Toole | |
| 8,056,970 B1 | 11/2011 | Phillips | |
| 8,282,161 B1 | 10/2012 | Jacobson | |
| 8,454,085 B1 * | 6/2013 | Hsu | A47C 31/11 297/182 |
| 8,727,435 B2 | 5/2014 | Centracco et al. | |
| 8,840,177 B2 | 9/2014 | Ballard et al. | |
| 8,894,140 B2 * | 11/2014 | Cho | B60R 7/043 297/188.2 |
| 9,022,465 B2 | 3/2015 | Arnold | |
| 9,084,495 B2 | 7/2015 | Ing et al. | |
| 9,609,845 B2 * | 4/2017 | Hartelius | A01K 1/0272 |
| 2006/0082196 A1 | 4/2006 | McConnell et al. | |
| 2007/0241581 A1 | 10/2007 | Martin | |
| 2008/0272166 A1 | 11/2008 | Frank et al. | |
| 2008/0283565 A1 | 11/2008 | Simon et al. | |
| 2009/0127882 A1 | 5/2009 | Thibodeau | |
| 2009/0134688 A1 | 5/2009 | Waltman et al. | |
| 2009/0224563 A1 | 9/2009 | Gregory | |
| 2011/0266820 A1 | 11/2011 | Hurwitz | |
| 2014/0319887 A1 | 10/2014 | Ing et al. | |
| 2015/0084385 A1 | 3/2015 | Arnold | |

* cited by examiner

DEBRIS CATCHING SYSTEM FOR A CHILD SEAT

BACKGROUND OF THE INVENTION

1. Field of the Invention

The present invention relates to a device that is removably attached to a child seat for a vehicle for catching debris. The device also provides an option to mount a sun shield.

2. Background of the Prior Art

Anyone who has children knows that all children, especially small children, tend to be messy. One only needs to look in a vehicle where a child seat is installed to see the messiness in ample glory. Crumbs, spilled juice, dropped toys and other various objects can be found in and near the child seat. In order to keep some semblance of order and cleanliness, vehicle owners combat this problem with routine cleanings in and around the child seat. Larger objects are picked up, smaller objects are vacuumed, and spilled liquid are wiped up often with soap or similar detergent. While such cleanups are effective, they are also time-consuming and, in the case of spilled liquids, cleanup may not come in sufficient time so as to avoid staining the vehicle's seating surface and possibly the flooring surface.

To address such problems, devices have been proposed to help control the inevitable debris issue brought about by the occupant of a child seat. Such devices, which come in a wide variety of architectures, work with varying degrees of efficiency, and come in one of two general varieties.

On type of device essentially works as a cover in order to cover the surface onto which the child seat is installed. Such devices are designed to catch any and all spilled debris and prevent such debris from coming in contact with the seating surface upon which the child seat is installed. While effective in such task, such devices have shortcomings. Many such devices are simply prophylactic covers that are essentially seat protectors. Such devices often allow the debris to spill onto the floor, possibly staining the carpet thereat, and often allow the debris to shift into the crevices between the seats or between the seat and the side of the vehicle, requiring the time-consuming task of vacuuming or otherwise retrieving the debris from such crevices. Additionally, in order to clean many such devices, the child seat must be partially or fully uninstalled from the vehicle, a task which many parents are simply not willing to allow. Further, many such devices impinge on neighboring seats, making the occupants of such neighboring seats, less than comfortable.

The other type of device is typically attached to the child seat in some fashion and catches the debris and holds the debris prior to the debris' ability to contact the seating surface or the floor. While such devices tend to be effective, many devices suffer from the fact that they are complex in design and are expensive to manufacture. Many devices are difficult to install, again often requiring either partial or total uninstallation of the child seat either to install or uninstall the device, a known negative.

What is needed is a device that can be used in conjunction with a typical child seat installed in a vehicle, wherein the device helps capture and hold debris dropped or spilled by an occupant of the child seat and effectively hold such debris for subsequent cleaning, all the while avoiding the above stated shortcomings found the in art. Such a device must be of relatively simple design and construction and be easy to install, maintain, and uninstall, all without the need to uninstall and reinstall the child seat properly, either fully or partially.

SUMMARY OF THE INVENTION

The debris catching system for a child seat of the present invention addresses the aforementioned needs in the art by providing a debris catching system that quickly and easily attaches to and detaches from a typical child seat used in a vehicle without the need to uninstall and then reinstall the child seat in order to attach or remove the system. The debris catching system for a child seat effectively catches and holds most dropped debris, including both solids and liquids, and holds the captured debris until the debris catching system for a child seat can be emptied and cleaned in routine fashion. The debris catching system for a child seat is of relatively simple design and construction so as to be relatively inexpensive to produce using standard manufacturing techniques so as to make the device economically cost-effective to potential consumers of this type of device.

The debris catching system for a child seat is comprised of a first frame member that has a first end and a second end such that a first panel wall is attached to the first frame. A second frame member has a third end and a fourth end such that a second panel wall is attached to the second frame. A first strap system connects the first end of the first frame with the third end of the second frame while a second strap system connects the second end of the first frame with the fourth end of the second frame. The first frame is positioned so as to face the first side of the base of the child seat and the second frame is positioned so as to face the second side of the base. The first strap system and the second strap system are used to cinch the first frame and the second frame to the base of a vehicle seat so as to hold the two frames against the seat base. A first pocket is located on the first panel wall between the first end and the second end, such that the first pocket is disposed between the first panel wall and the base while a second pocket is located on the second panel wall between the third end and the fourth end, such that the second pocket is disposed between the second panel wall and the seat base. The first panel wall and its first pocket and the second panel wall and its second pocket are each made from a moisture impervious material. A third panel wall may be attached to the first frame such that the third panel wall can slide up and down with respect to the first panel wall while a fourth panel wall may be attached to the second frame such that the fourth panel wall can slide up and down with respect to the second panel wall. A third strap system connects a medial portion of the first frame with a medial portion of the second frame and is positioned against the back member to allow for adjustment of the first and second frames to a desired angle.

BRIEF DESCRIPTION OF THE DRAWINGS

Similar reference numerals refer to similar parts throughout the several views of the drawings.

DESCRIPTION OF THE PREFERRED EMBODIMENT

Figure 1:
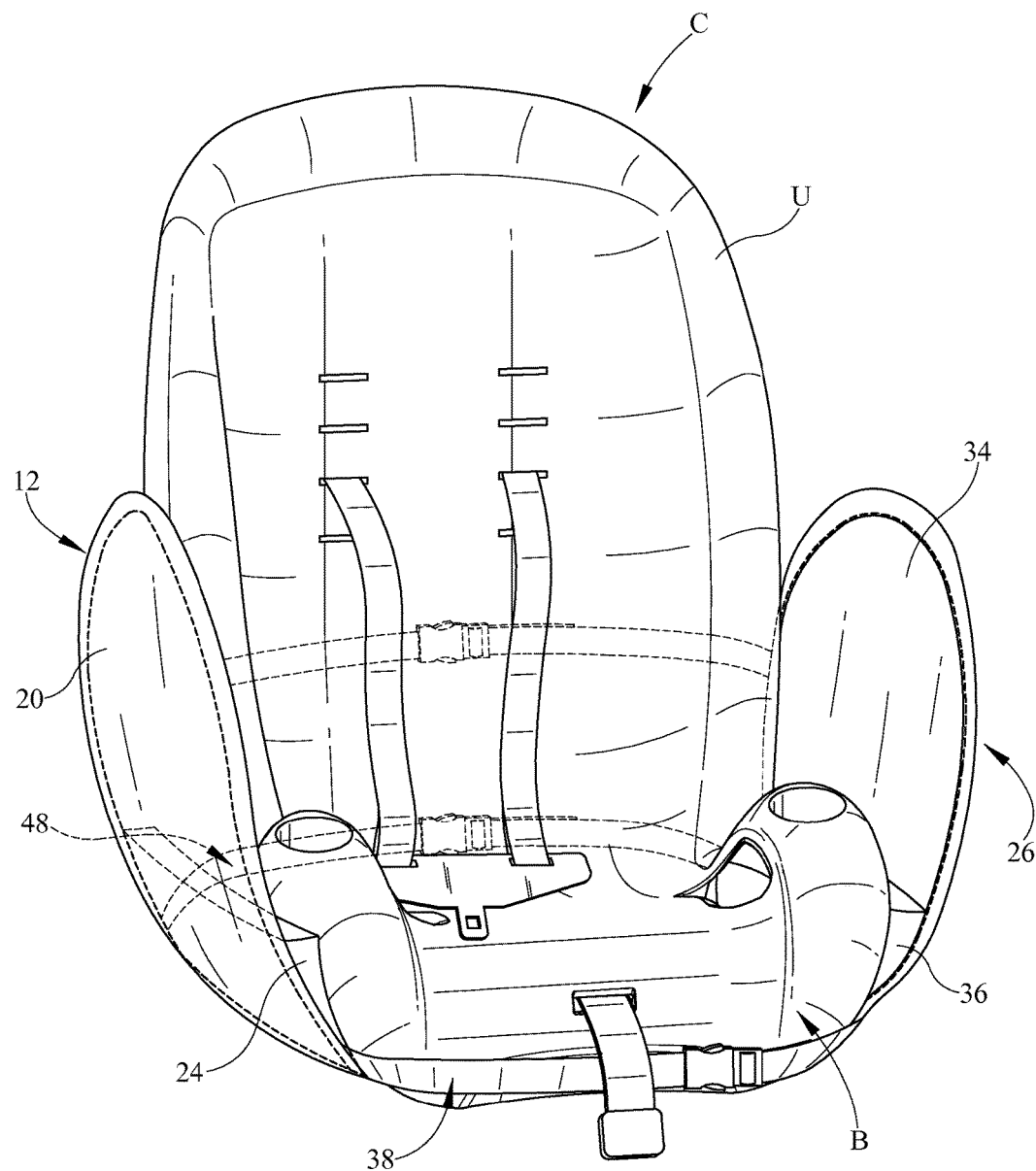
FIG. 1 is a perspective view of the debris catching system for a child seat of the present invention installed on a child seat used in a vehicle.
Figure 2:
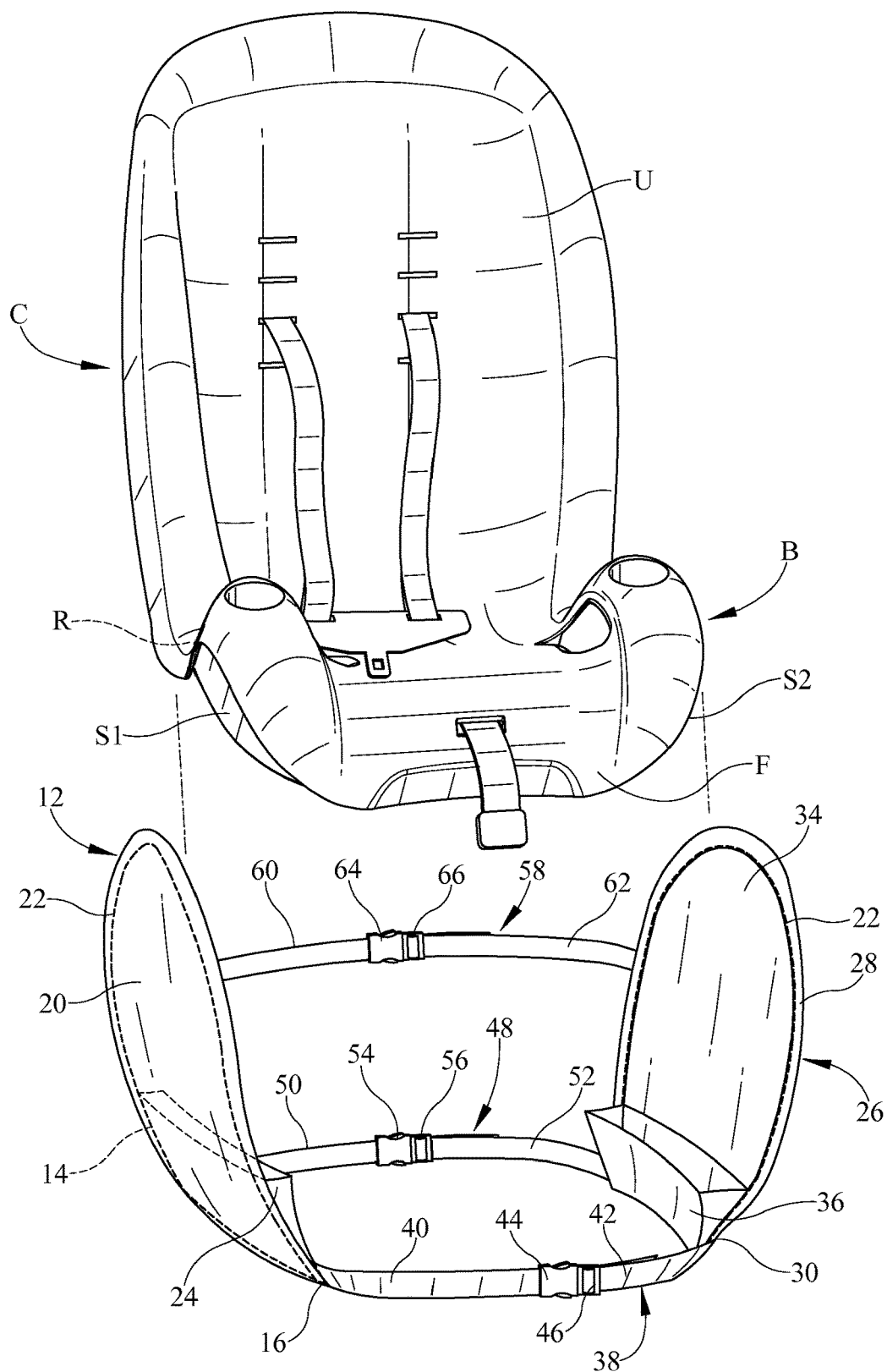
FIG. 2 is a perspective view of the debris catching system for a child seat in relation to the child seat.
Figure 3:
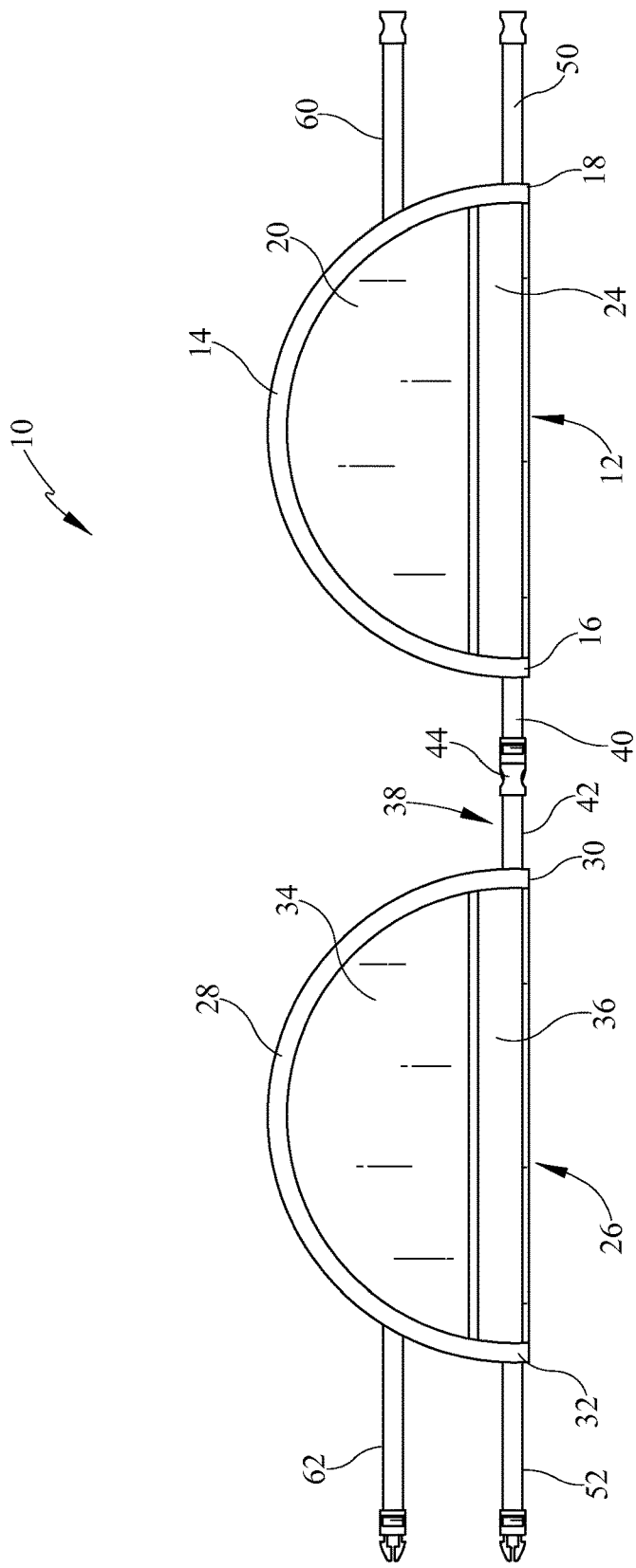
FIG. 3 is a plan view of the debris catching system for a child seat.

Referring now to the drawings, it is seen that the debris catching system for a child seat of the present invention, generally denoted by reference numeral 10, is comprised of a first panel 12 that has a first frame 14 having a first lower end 16 and a second lower end 18. A first shielding wall 20 is attached to the first frame 14 such as via the illustrated stitching 22. A first pocket 24 is located at the lower section of the first shielding wall 20 between the first lower end 16 and the second lower end 18. The first shielding wall 20, along with the first pocket 24, are each made from an appropriate lightweight and generally moisture impervious material, such as nylon, flexible plastic, GORE-TEX, etc. The first frame 14 is made from an appropriate flexible material such as a resilient wire, which may be plastic coated.

A second panel 26, which is substantially similar to the first panel 12, has a second frame 28 having a third lower end 30 and a fourth lower end 32. A second shielding wall 34 is attached to the second frame 28 such as via the illustrated stitching 22. A second pocket 36 is located at the lower section of the second shielding wall 34 between the third lower end 30 and the fourth lower end 32. The second shielding wall 34, along with the second pocket 36, are each made from an appropriate lightweight and generally moisture impervious material, such as nylon, flexible plastic, GORE-TEX, etc. The second frame 28 is made from an appropriate flexible material such as a resilient wire, which may be plastic coated.

As seen, a first strap system 38 connects the lower front of the first frame 14 and the second frame 28 by having a first strap section 40 attached to the first lower end 16 of the first frame 14 while a second strap section 42 is attached to the third lower end 30 of the second frame 28. The two strap sections 40 and 42 are mateable with one another via an appropriate fastener 44. A strap sizing buckle 46 is provided on one of the strap sections 40 or 42 in order to allow length adjustment of the first strap system 38.

Similarly, a second strap system 48 connects the lower rear of the first frame 14 and the second frame 28 by having a third strap section 50 attached to the second lower end 18 of the first frame 14 while a second strap section 52 is attached to the fourth lower end 32 of the second frame 28. The two strap sections 50 and 52 are mateable with one another via an appropriate fastener 54. A strap sizing buckle 56 is provided on one of the strap sections 50 or 52 in order to allow length adjustment of the second strap system 48.

Similarly, a third strap system 58 connects a medial section of the first frame 14, above the second lower end 18 and a medial section of the second frame 28 by having a fifth strap section 60 attached to the first frame 14 and a sixth strap section 62 is attached to the second frame 28. The two strap sections 60 and 62 are mateable with one another via an appropriate fastener 64. A strap sizing buckle 66 is provided on one of the strap sections 60 or 62 in order to allow length adjustment of the third strap system 58.

In order to use the debris catching system for a child seat 10 of the present invention, a child seat C is installed in a vehicle in the usual way. As seen, the typical child seat C has a base B with a front F, a back R joined by a first side 51 and a second side S2, the base B forming the seating portion for the child as well as a seat back U, many of which are detachable from the base B. Once the child seat C is installed, the debris catching system for a child seat 10 is positioned so that the first panel 12 faces the first side 51 of the base B with the first pocket 24 between the first panel 12 and the base and the second panel 26 is positioned so that it faces the second side S2 of the base B with the second pocket 36 between the second panel 26 and the base B. The debris catching system for a child seat 10 is secured thereat by connecting the first strap section 40 with the second strap section 42 at the front F of the base B and securing the third strap section 50 with the fourth strap section 52 at the back R of the base. The first strap system 38 and/or the second strap system 48 are size adjusted via the appropriate buckle 46 and/or 56 respectively, so as to cinch the debris catching system for a child seat about the base B of the child seat C. The fifth strap section 60 is connected to the sixth strap section 62 in order to stabilize the debris catching system for a child seat 10 against the medial portion of the seat back U, the third strap system 58 is size adjusted as needed via its buckle 66. The debris catching system for a child seat 10 is now ready for use.

Debris that is generated by a child is caught by either the first panel 12 or the second panel 26 wherein it slides or flows down into the respective pocket of the panel and held thereat until being cleaned out. The pockets 24 and 36 of the first shielding wall 20 and the second shielding wall 34, respectively, hold the debris, either solid, liquid, or some combination, therein and help prevent spillage, even in adverse driving conditions. As the shielding walls 20 and 34 and their respective pockets 24 and 36 are made from moisture impervious material, seepage of liquids out of the pockets 24 or 36 does not occur. As the first frame 14 and the second frame 28 are each made from a resilient material, the frames will flex as needed, so that, for example, if the child seat C is next to a door or other body panel of the vehicle or another passenger, the frame can flex toward the child seat C.

Figure 4:
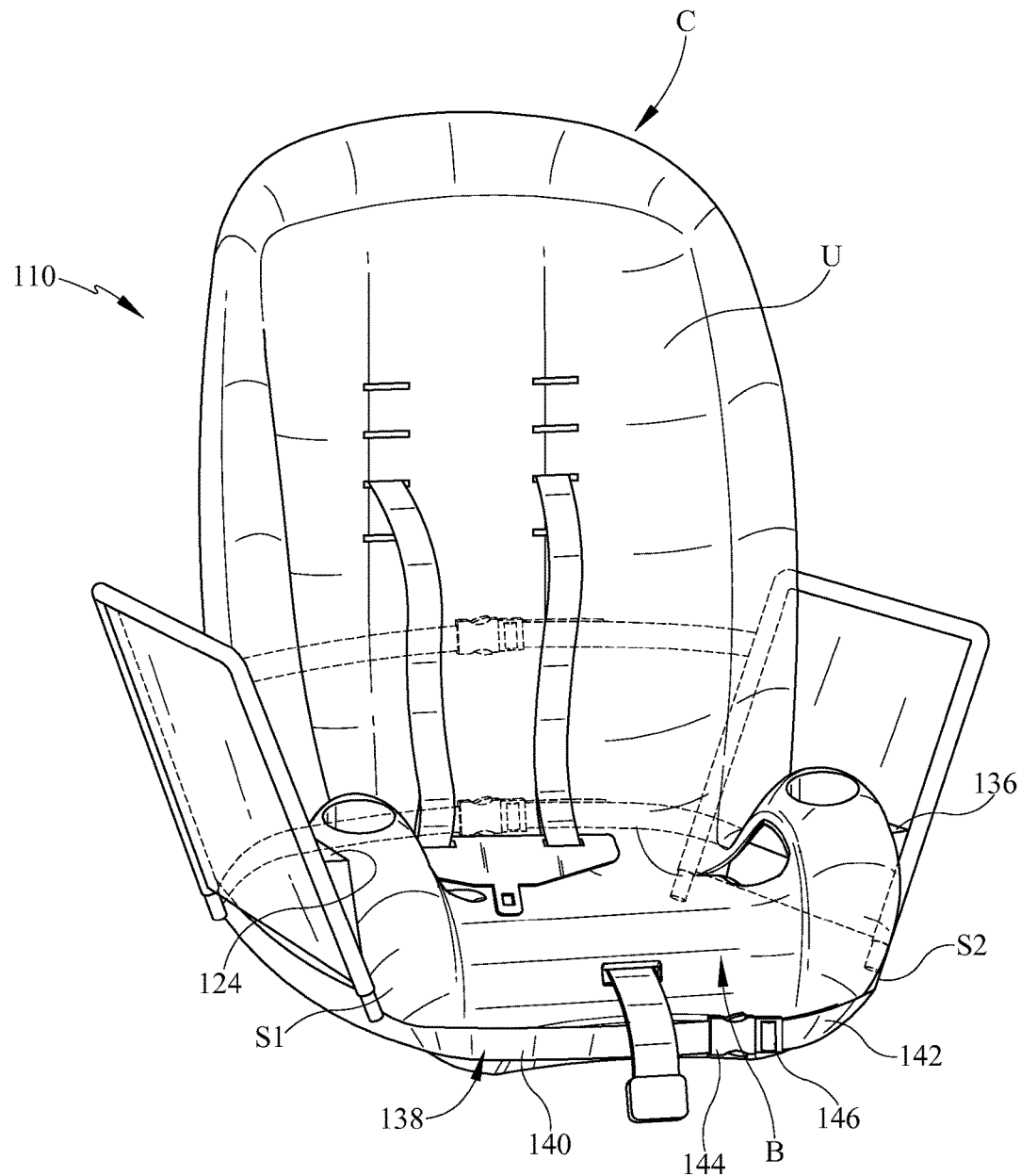
FIG. 4 is a perspective view of an alternate embodiment of the debris catching system for a child seat installed onto the child seat, the alternate embodiment including the ability to provide sun shading to an occupant of the child seat.
Figure 5:
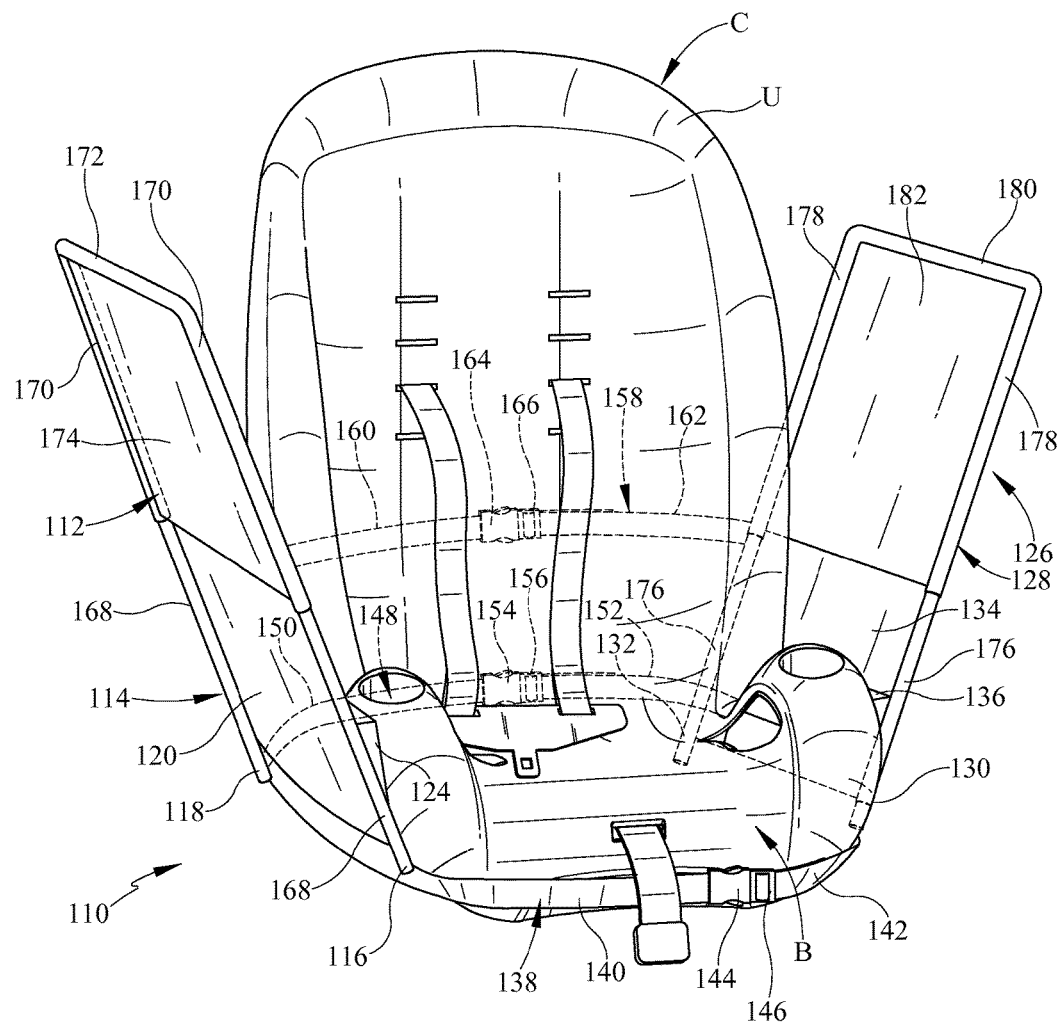
FIG. 5 is a perspective view of an alternate embodiment of the debris catching system for a child seat with one of the shade panels extended.

As seen in FIGS. 4 and 5, in an alternate embodiment of the debris catching system for a child seat of the present invention 110, the invention is comprised of a first panel 112 that has a first frame 114 having a first lower end 116 and a second lower end 118. As seen, the first frame 114 is comprised of a first pair of generally parallel uprights 168 and a first upper frame member that has a second pair of generally parallel uprights 170 that each receive a respective one of the first pair of uprights 168 so that the second pair of uprights 170 can telescopically slide up and down on the first pair of uprights 168. A first cross bar 172 connects the upper ends of the second uprights 170. A first shielding wall 120 is attached to the first pair of uprights 168 in appropriate fashion such as via stitching while a second shielding wall 174 is attached to the second pair of uprights 170 and to the first cross bar 172 in appropriate fashion such as via stitching. A first pocket 124 is located at the lower section of the first shielding wall 120 between the first lower end 116 and the second lower end 118 of the first frame 114 or may be located on the lower section of the second shielding wall 174. The first shielding wall 120 along with the first pocket are each made from an appropriate lightweight and generally moisture impervious material, such as nylon, flexible plastic, GORE-TEX, etc. The second shielding wall 174 may be made from the same or similar material as the first shielding wall 120 or may be made from a light blocking material that helps block some of the sun light or other light that is imposed on the second shielding wall 174. The first frame 114 is made from an appropriate flexible or rigid or semi-rigid material.

A second panel 126, which is substantially similar to the first panel 114 has a second frame 128 having a third lower end 130 and a fourth lower end 132. As seen, the second frame 128 is comprised of a third pair of generally parallel uprights 176 and a second upper frame member that has a fourth pair of generally parallel uprights 178 that each receive a respective one of the third pair of uprights 176 so that the fourth pair of uprights 178 can telescopically slide up and down on the third pair of uprights 176. A second cross bar 180 connects the upper ends of the fourth uprights 178. A third shielding wall 134 is attached to the third pair of uprights 176 in appropriate fashion such as via stitching while a second shielding wall 182 is attached to the fourth pair of uprights 178 and to the first cross bar 172 in appropriate fashion such as via stitching. A second pocket I 136 s located at the lower section of the third shielding wall 134 between the third lower end 130 and the fourth lower end 132 of the second frame 128 or may be located on the lower section of the fourth shielding wall 182. The third shielding wall 134 along with the second pocket are each made from an appropriate lightweight and generally moisture impervious material, such as nylon, flexible plastic, GORE-TEX, etc. The fourth shielding wall 182 may be made from the same or similar material as the first shielding wall 120 or may be made from a light blocking material that helps block some of the sun light or other light that is imposed on the fourth shielding wall 182. The second frame 128 is made from an appropriate flexible or rigid or semi-rigid material.

A seen, a first strap system 138 connects the lower front of the first frame 114 and the second frame 128 by having a first strap section 140 attached to the first lower end 116 of the first frame 114 while a second strap section 142 is attached to the third lower end 130 of the second frame 128. The two strap sections 140 and 142 are mateable with one another via an appropriate fastener 144. A strap sizing buckle 416 is provided on one of the strap sections 140 or 142 in order to allow length adjustment of the first strap system 138.

Similarly, a second strap system 148 connects the lower rear of the first frame 114 and the second frame 128 by having a third strap section 150 attached to the second lower end 118 of the first frame 114 while a second strap section 152 is attached to the fourth lower end 132 of the second frame 128. The two strap sections 150 and 152 are mateable with one another via an appropriate fastener 154. A strap sizing buckle 156 is provided on one of the strap sections 150 or 152 in order to allow length adjustment of the second strap system 148.

Similarly, a third strap system 158 connects a medial section of the first frame 114, above the second lower end 118 and a medial section of the second frame 128 by having a fifth strap section 160 attached to the first frame 114 and a sixth strap section 162 is attached to the second frame 128. The two strap sections 160 and 162 are mateable with one another via an appropriate fastener 164. A strap sizing buckle 166 is provided on one of the strap sections 160 or 162 in order to allow length adjustment of the third strap system 158.

In order to use the debris catching system for a child seat 110 of the present invention, a child seat C is installed in a vehicle in the usual way. As seen, the typical child seat C has a base B with a front F, a back R joined by a first side S1 and a second side S2, the base B forming the seating portion for the child as well as a seat back U, many of which are detachable from the base B. Once the child seat C is installed, the debris catching system for a child seat 10 is positioned so that the first panel 112 faces the first side S1 of the base B with the first pocket, is located between the first panel 12 and the base and the second panel 26 is positioned so that it faces the second side S2 of the base B with the second pocket 36 between the second panel 26 and the base B. The debris catching system for a child seat 110 is secured thereat by connecting the first strap section 140 with the second strap section 142 at the front F of the base B and securing the third strap section 150 with the fourth strap section 152 at the back R of the base. The first strap system 138 and/or the second strap system 148 are size adjusted via the appropriate buckle 146 and/or 156 respectively, so as to cinch the debris catching system for a child seat about the base B of the child seat C. The fifth strap section 160 is connected to the sixth strap section 162 in order to stabilize the debris catching system for a child seat 110 against the medial portion of the seat back U, the third strap system 258 is size adjusted as needed via its buckle 166. The debris catching system for a child seat 10 is now ready for use.

Debris that is generated by a child is caught by either the first panel 12 or the second panel wherein it either slides or flows down into the respective pocket of the panel and held thereat until being cleaned out or is localized between the respective panel and the child seat C. The pockets hold the debris, either solid, liquid, or some combination, therein and help prevent spillage, even in adverse driving conditions. If the first frame 114 and the second frame 128 are each made from a resilient material or at least a semi-rigid material, the frames will flex as needed, so that, for example, if the child seat C is next to a door or other body panel of the vehicle or another passenger, the frame can flex toward the child seat C, otherwise the frames 114 and 128 can pivot about the first strap system 138 and the second strap system 148 in order to pivot out of the way for clearance. If the sun is shining into the eyes of a child within the child seat, then either the first upper frame member and its second shield wall 174 or the second frame member and its fourth shielding wall 182, as appropriate, is slid upwardly with respect to its first uprights 168 or third uprights 178, respectively, in order to help block the sun. When no longer needed, the appropriate upper frame is slid back down.

While the invention has been particularly shown and described with reference to embodiments thereof, it will be appreciated by those skilled in the art that various changes in form and detail may be made without departing from the spirit and scope of the invention.

I claim:

1. A debris catching system for attachment to a child seat used in a vehicle, the child seat having a base with a front and an opposing rear joined by a first side and a second side with a removable back member extending upwardly from the base proximate the rear, the debris catching system comprising:
    a first frame member having a first end and a second end such that a first shielding wall is attached to the first frame;
    a first pocket located on the first shielding wall between the first end and the second end, such that the first pocket is disposed on a third side of the first shielding wall so as to be adapted to be positioned facing the base;

a second frame member having a third end and a fourth end such that a second shielding wall is attached to the second frame;
a first strap system connecting the first end of the first frame with the third end of the second frame;
a second strap system connecting the second end of the first frame with the fourth end of the second frame; and
such that the first frame is adapted to be positioned facing the first side of the base of the child seat and the second frame is adapted to be positioned facing the second side of the base and such that the first strap system and the second strap system are adapted to be used to cinch the first frame and the second frame to the base.

2. The debris catching system as in claim 1 wherein the first shielding wall and the first pocket are each made from a moisture impervious material.

3. The debris catching system as in claim 1 further comprising a second pocket located on the second shielding wall between the third end and the fourth end, such that the second pocket is disposed on a fourth side of the second shielding wall so as to be adapted to be positioned facing the base.

4. The debris catching system as in claim 3 wherein the first shielding wall, the first pocket, the second shielding wall and the second pocket are each made from a moisture impervious material.

5. The debris catching system as in claim 1 further comprising a third strap system connecting a medial portion of the first frame with a medial portion of the second frame and adapted to be positioned against the back member.

6. The debris catching system as in claim 1 in combination with the child seat.

7. The debris catching system as in claim 6 further comprising a third strap system connecting a medial portion of the first frame with a medial portion of the second frame and positioned against the back member.

8. A debris catching system for attachment to a child seat used in a vehicle, the child seat having a base with a front and an opposing rear joined by a first side and a second side with a removable back member extending upwardly from the base proximate the rear, the debris catching system comprising:
a first frame member having a first end and a second end such that a first shielding wall is attached to the first frame;
a second frame member having a third end and a fourth end such that a second shielding wall is attached to the second frame;
a first strap system connecting the first end of the first frame with the third end of the second frame;
a second strap system connecting the second end of the first frame with the fourth end of the second frame;
a third shielding wall attached to the first frame such that the third shielding wall slides up and down with respect to the first shielding wall; and
such that the first frame is adapted to be positioned facing the first side of the base of the child seat and the second frame is adapted to be positioned facing the second side of the base and such that the first strap system and the second strap system are adapted to be used to cinch the first frame and the second frame to the base.

9. The debris catching system as in claim 8 wherein the first shielding wall is made from a moisture impervious material.

10. The debris catching system as in claim 8 further comprising:
a first pocket located on the first shielding wall between the first end and the second end, such that the first pocket disposed on a third side of the first shielding wall so as to be adapted to be positioned facing the base; and
a second pocket located on the second shielding wall between the third end and the fourth end, such that the second pocket is disposed on a fourth side of the second shielding wall so as to be adapted to be positioned facing the base.

11. The debris catching system as in claim 10 wherein the first shielding wall, the first pocket, the second shielding wall and the second pocket are each made from a moisture impervious material.

12. The debris catching system as in claim 8 further comprising a fourth shielding wall attached to the second frame such that the fourth shielding wall slides up and down with respect to the second shielding wall.

13. The debris catching system as in claim 8 further comprising a third strap system connecting a medial portion of the first frame with a medial portion of the second frame and adapted to be positioned against the back member.

14. The debris catching system as in claim 8 in combination with the child seat.

15. The debris catching system as in claim 14 further comprising:
a first pocket located on the first shielding wall between the first end and the second end, such that the first pocket disposed on a third side of the first shielding wall so as to be adapted to be positioned facing the base; and
a second pocket located on the second shielding wall between the third end and the fourth end, such that the second pocket is disposed on a fourth side of the second shielding wall so as to be adapted to be positioned facing the base.

16. The debris catching system as in claim 14 further comprising a fourth shielding wall attached to the second frame such that the fourth shielding wall slides up and down with respect to the second shielding wall.

17. The debris catching system as in claim 14 further comprising a third strap system connecting a medial portion of the first frame with a medial portion of the second frame and adapted to be positioned against the back member.

* * * * *